United States Patent [19]

Davis

[11] 4,079,680
[45] Mar. 21, 1978

[54] FERTILIZER INJECTION APPARATUS INCLUDING SOIL WORKING DEVICE

[76] Inventor: Donald A. Davis, R.R. 2, Box 328, Covington, Ind. 47932

[21] Appl. No.: 727,898

[22] Filed: Sep. 29, 1976

[51] Int. Cl.² ............................................. A01C 23/02
[52] U.S. Cl. ........................................ 111/7; 111/86; 172/724
[58] Field of Search ............................ 111/6, 7, 85, 86; 172/713, 720–730

[56] References Cited

U.S. PATENT DOCUMENTS

| | | | |
|---|---|---|---|
| 430,016 | 6/1890 | Harvey | 172/721 |
| 1,102,230 | 7/1914 | Bates | 172/722 |
| 2,558,154 | 6/1951 | Porter | 172/730 X |
| 2,842,077 | 7/1958 | Morrison | 111/7 |
| 3,038,424 | 6/1962 | Johnson | 111/7 |
| 3,152,649 | 10/1964 | Arnold | 172/730 |
| 3,919,951 | 11/1975 | Williams et al. | 111/7 |

FOREIGN PATENT DOCUMENTS

| | | | |
|---|---|---|---|
| 32,200 | 9/1922 | Denmark | 172/222 |

*Primary Examiner*—Edgar S. Burr
*Assistant Examiner*—James R. Feyrer
*Attorney, Agent, or Firm*—John R. Nesbitt

[57] ABSTRACT

An apparatus is disclosed for injecting fertilizer into the soil. A soil working device includes a sweep with a nose portion that moves through the soil as the sweep is moved forward, a pair of trailing sections that diverge from the nose portion, and an upstanding mounting portion for mounting the sweep to a shank extending from the frame of an agricultural implement. A pair of wings extend rearwardly from the trailing sections of the sweep so as to be at opposite sides of a channel formed by the sweep. Each wing has a front portion that flares outwardly from the trailing section of the sweep and a rear portion that is inclined inwardly from the back of the front portion. Fertilizer is injected into the channel formed by the sweep and soil engaged by the wings is urged toward the channel to cover the same and enhance fertilizer retention in the channel. The apparatus is particularly useful for injecting anhydrous ammonia in liquid form into soil contact with the anhydrous ammonia being maintained under sufficient pressure to remain in a liquid state until brought into soil contact in the channel after which the anhydrous ammonia changes to a gaseous state.

6 Claims, 5 Drawing Figures

FERTILIZER INJECTION APPARATUS INCLUDING SOIL WORKING DEVICE

FIELD OF THE INVENTION

This invention relates to fertilizer injection apparatus and, more particularly, relates to fertilizer injection apparatus having a novel soil working device.

BACKGROUND OF THE INVENTION

In farming operations, the use of fertilizer to enhance crop yields has been known for many years. In an effort to make the use of fertilizer more efficient, new types of fertilizer have also been developed over the years. As the use of fertilizer increased and as new types were developed, mechanization for application of the fertilizer had to be developed and then improved.

While mechanization for application of some types of fertilizer did not prove to be overly difficult, mechanization for application of other types of fertilizer such as, for example, application of chemical fertilizers in liquid-gaseous form, proved to be more difficult and a completely satisfactory apparatus has not heretofore been developed for this purpose in many cases.

With respect to chemical fertilizers of the liquid-gaseous form, anhydrous ammonia is now most typically utilized in farming operations. Anhydrous ammonia in its natural state is a gas. Upon sufficient pressure, however, anhydrous ammonia turns to a liquid and it is in this form that anhydrous ammonia is stored until being inserted into the soil for fertilizing purposes.

Apparatus has heretofore been developed and/or utilized for inserting chemical fertilizer such as anhydrous ammonia into the soil. Typical of such apparatus is apparatus that includes a knife for cutting rather deeply into the soil with the anhydrous ammonia being inserted at the back of the knife. Such a knife is shown, for example, in U.S. Pat. Nos. 3,605,657 and 3,863,842.

One of the problems associated with application of anhydrous ammonia is that the gaseous form of anhydrous ammonia can easily escape from a furrow and when this occurs, there is, of course, no useful fertilizer deposit. Applicators have been developed with a view toward retaining the gaseous state anhydrous ammonia in the furrow, but such applicators have not proved to be completely successful, at least in some respects. Examples of applicators having elements to cover applied fertilizer are shown in U.S. Pat. Nos. 2,849,969; 3,157,139; 3,227,226; 3,536,145; 3,605,657; 3,707,132; 3,854,429; and 3,863,842.

A sweep type of applicator for anhydrous ammonia has also been heretofore suggested. Examples of the use of such a sweep are shown by U.S. Pat. Nos. 2,842,077 and 3,038,424. While the sweep type applicator was modified in an attempt to maintain the anhydrous ammonia in the formed channel, this type of applicator has also not proved to be completely satisfactory for anhydrous ammonia applications and could be improved if better retention of the anhydrous ammonia in the formed channel could be achieved.

SUMMARY OF THE INVENTION

This invention provides an improved applicator for injecting fertilizer into the soil that provides a novel soil working device that includes a sweep with rearwardly extending wings. Utilizing this invention, anhydrous ammonia in liquid form is released into a channel formed by the sweep where it later turns into a gaseous state with retention being enhanced by soil urged to the channel by the wings extending from the sweep.

It is therefore an object of this invention to provide an improved apparatus for injecting fertilizer into the soil.

It is another object of this invention to provide an improved apparatus for injecting anhydrous ammonia into the soil.

It is still another object of this invention to provide an improved apparatus for inserting anhydrous ammonia into the soil with improved retention of said anhydrous ammonia in said soil.

It is yet another object of this invention to provide an improved apparatus for injecting fertilizer into the soil including a sweep type applicator with soil arranging means connected with the sweep type applicator.

It is still another object of this invention to provide an apparatus for injecting fertilizer into the soil including a sweep having a pair of wings extending rearwardly therefrom at opposite sides of a channel formed by the sweep as it is moved through the soil.

It is yet another object of this invention to provide a novel soil working device.

It is still another object of this invention to provide a novel soil working device for an applicator to inject fertilizer into the soil.

It is yet another object of this invention to provide a soil working device that includes a sweep with a nose portion and a pair of trailing sections that diverge from the nose portion with each trailing section having a wing extending rearwardly therefrom.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the hereindisclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
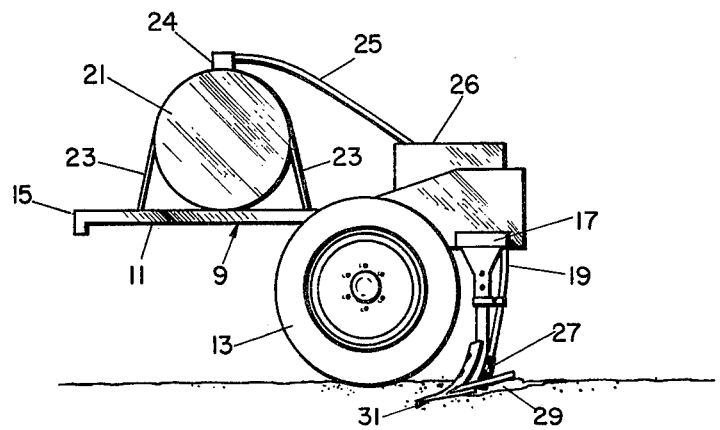
FIG. 1 is a side view of an agricultural implement having the apparatus of this invention mounted thereon.

Referring now to the drawings, the apparatus of this invention is shown in FIG. 1 mounted on a farm implement 9. Implement 9 is shown in simplified form and could be, for example, an implement that accomplishes a plurality of farming operations in one pass across a field as is well known in the art.

As shown in FIG. 1, implement 9 includes a frame 11 supported by wheels 13 with the implement being adapted at the front 15 for connection to a tractor (not shown). The frame includes one or more crossbars 17 upon which are mounted a plurality of downwardly extending shanks which are spaced along the crossbar distances corresponding to rows to be formed. Shanks 19 can be aligned as shown in FIG. 1, or may be staggered, as is well known in the art.

Figure 2:
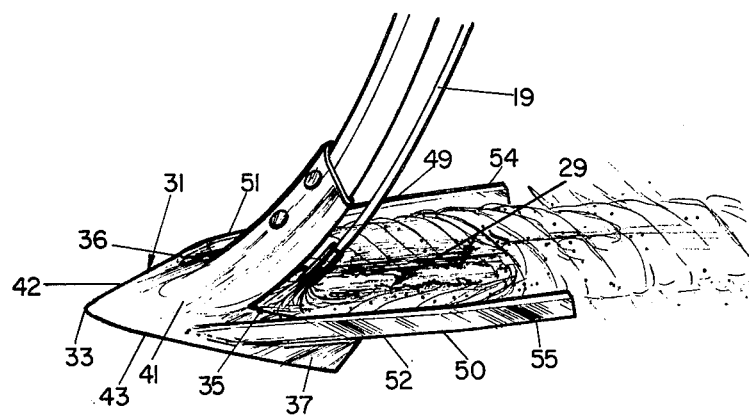
FIG. 2 is a perspective view of the soil working device shown in FIG. 1 and also showing the positioning of a fertilizer applicator with respect to the soil working device.
Figure 3:
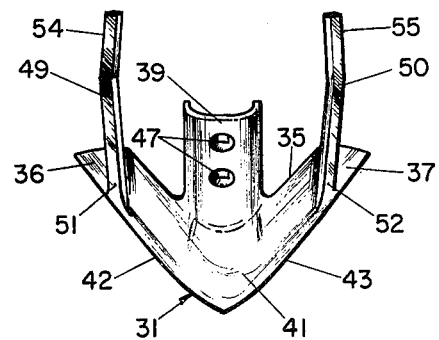
FIG. 3 is a top view of the soil working device as shown in FIG. 2.
Figure 4:
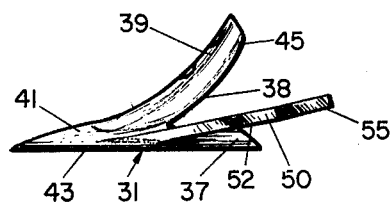
FIG. 4 is a side view of the soil working device as shown in FIG. 2.
Figure 5:
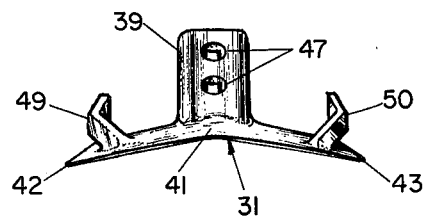
FIG. 5 is a front view of the soil working device as shown in FIG. 2.

A storage reservoir, or tank, 21 is mounted on frame 11 by supports 23. Anhydrous ammonia is maintained in the storage tank under sufficient pressure so as to be in liquid form and is conducted from the tank through valve 24 and conduits 25 to a unit 26 for maintaining the anhydrous ammonia in liquid form so that liquid form anhydrous ammonia is injected into the formed channel (as indicated in FIG. 2). Unit 26 handles the anhydrous ammonia from the storage tank and preferably is adjacent to the point of application to the soil. A unit for accomplishing this end is commercially available from AgriChemicals, a division of United States Steel, and is known as a COLD-FLO Ammonia system. The anhydrous ammonia in liquid form is conducted to the dispensing head 27 which is mounted at the rear of shanks 19 so as to release the anhydrous ammonia in liquid form into a channel 29 formed by the soil working device 31. If desired, the dispensing head 27 of the fertilizer apparatus could be mounted on the soil working device 31. The anhydrous ammonia in liquid form later turns into gaseous form after the channel is covered as brought out hereinafter.

Soil working device 31 is a modified sweep type unit with a sweep including a nose portion 33, a rear portion 35 that includes a pair of trailing sections 36 and 37, and an upstanding mounting portion 39.

Nose portion 33 of the sweep is arcuate with the center section 41 raised with respect to the outer edges 42 and 43. The trailing sections 36 and 37 are inclined upwardly and inwardly from the outer edges and are integrally formed with the nose portion. The upstanding mounting portion 39 is also integrally formed with the nose portion and extends upwardly from the back of the nose portion. Mounting plate 39 preferably has the outer edges 45 curled to form a channel and one or more apertures 47 are in the mounting plate for receiving bolts or the like to mount the sweep to the shank.

Each trailing section (36 and 37) has a wing (49 and 50, respectively) extending rearwardly therefrom. Each wing has a front portion (51 and 52) mounted on the top side of the trailing sections, as by welding, for example, adjacent to the mounting portion as shown in the drawings. The front portions 51 and 52 of the wings extend rearwardly from the trailing sections and flare outwardly therefrom. Each wing 49 and 50 also has a rear portion 54 and 55 that is integrally formed with the front portion and extends rearwardly from the front portion with the rear portions being inclined inwardly from front to back and being twisted so that the top side of the rear portion is more inwardly inclined than is the bottom side.

In a working embodiment of this invention, the sweep was of steel of about ⅛ inch thickness with the trailing sections 36 and 37 extending about 4 inches from the rear of the nose portion and the mounting plates extending upwardly about 4 inches. Wings 49 and 50 are formed of bar or rod-like steel stock of about ⅜ inch thickness and ¾ inch width with a total length of about 9 inches, of which about 5/12 inches extend from the rear of the trailing sections.

The foregoing dimensions of a working embodiment are for illustrative purposes only, however, and the invention is not meant to be limited thereto.

In operation, the farm implement is towed, as by a tractor, so that the sweep is moved through the soil to form a channel therein. Anhydrous ammonia in liquid form is released into the channel formed by the sweep and wings 49 and 50 engage soil at opposite sides of the channel formed by the sweep to urge soil toward the channel to cover the same. It has been found that this efficiently enhances the retention of the gaseous state anhydrous ammonia in the channel and thus reduces loss of utilizable fertilizer in the soil. As can be appreciated, the sweep need not open a deep channel, and, in fact, opens only a shallow channel as shown by FIGS. 1 and 2. This reduces the amount of power necessary to accomplish the desired end.

As can be seen from the foregoing, this invention provides an improved apparatus for injecting fertilizer into the soil and provides a novel soil working device for this purpose.

What is claimed is:

1. In an apparatus for injecting fertilizer into the soil, a soil working device, comprising:
   support means;
   a sweep having a nose portion, a rear portion including a pair of trailing sections connected with said nose portion and diverging rearwardly therefrom, each of said trailing sections having a top surface with front, rear and outer edges, said sweep also having a mounting portion for mounting said sweep onto said support means;
   fertilizer injection means mounted on said sweep for injecting fertilizer into a channel formed in soil engaged by said sweep when said sweep is moved through said soil by said apparatus;
   fertilizer supply means mounted on said support means and connected with said fertilizer injection means to supply fertilizer thereto; and
   soil arranging means including a pair of elongated wings each of which has a longitudinal axis that is substantially parallel to the channel formed by said sweep, and each of said wings also having a front portion that is positioned above and attached to different ones of said top surface of said trailing sections of said sweep adjacent to said front edge thereof and inwardly of said outer edge, each of said wings also having a middle portion that extends above and rearwardly from said trailing sections of said rear portion of said sweep past said rear edges of said top surface, and a rear portion that extends rearwardly from said middle portion and is arranged so as to be engageable with soil rearwardly of said trailing sections of said sweep and said fertilizer injection means to urge said soil over a channel formed by said sweep when said sweep is moved through said soil by said apparatus.

2. The soil working device of claim 1 wherein the ratio of the length of each of said wings with respect to the length of each of said trailing sections of said sweep is about two to one.

3. The soil working device of claim 1 wherein the front portion of each of said wings extends rearwardly and slightly outwardly and wherein the rear portion of each of said wings extends rearwardly and slightly inwardly from said middle portion of each wing.

4. The soil working device of claim 3 wherein each of said wings is of bar-like material and wherein said rear portion is twisted with respect to the front portion with the top of said rear portion being more inwardly inclined than is the bottom of said rear portion.

5. The soil working device of claim 4 wherein said bar-like material has about a two to one width to thickness ratio.

6. An apparatus for injecting fertilizer into the soil, said apparatus comprising:

support means;

a shank mounted on said support means;

a soil engaging sweep mounted on said shank with said sweep including a nose portion for forming a channel in said soil as said sweep is moved by said support means forwardly through said soil, said sweep including a pair of trailing sections that diverge from said nose portion with said fertilizer depositing means being positioned between said trailing sections of said sweep with each of said trailing sections having a top surface with front, rear and outer edges;

a tank mounted on said support means for storing anhydrous ammonia under pressure;

fertilizer depositing means contiguous to said sweep to release fertilizer in a channel formed by said sweep when said support means is propelled in a predetermined direction;

means connected with said tank and with said fertilizer depositing means for conducting anhydrous ammonia in liquid form from said tank to said fertilizer depositing means in a manner such that said anhydrous ammonia is deposited in said channel in liquid form; and soil arranging means including a pair of elongated wings each of which has a longitudinal axis that extends substantially parallel to the channel formed by said sweep, and each of which has a front portion positioned above and attached to different ones of said top surface of said trailing sections of said sweep adjacent to said front edge thereof and inwardly of said outer edge, each of said wings also having a middle portion that extends above and rearwardly from said trailing section of said sweep past said rear edges of said top surface, and a rear portion that extends rearwardly from said middle portion with said rear portion being positioned rearwardly of said trailing sections of said sweep and said fertilizer depositing means and adjacent to a formed channel having fertilizer in liquid form released therein to engage the soil thereat and cause said soil to be urged toward said channel to enhance fertilizer retention in said channel, said anhydrous ammonia changing to a gaseous form after release in said channel and after said arranging means has urged said soil toward said channel.

* * * * *